L. E. ARNOLD.
PROCESS OF COLORING PINEAPPLES.
APPLICATION FILED MAR. 27, 1911.

1,046,716.

Patented Dec. 10, 1912.

Witnesses.
D. W. Edelin

Inventor.
L. E. Arnold,
by Pennie Goldsborough & O'Neill
attys.

UNITED STATES PATENT OFFICE.

LEWIS E. ARNOLD, OF HONOLULU, TERRITORY OF HAWAII.

PROCESS OF COLORING PINEAPPLES.

1,046,716.  Specification of Letters Patent.  Patented Dec. 10, 1912.

Original application filed April 2, 1910, Serial No. 553,039. Divided and this application filed March 27, 1911. Serial No. 617,138.

*To all whom it may concern:*

Be it known that I, LEWIS E. ARNOLD, a citizen of the United States, residing at Honolulu, county of Honolulu, Territory of Hawaii, have invented certain new and useful Improvements in Processes of Coloring Pineapples; and I do hereby declare the following to be a full, clear, and exact description of the invention, such as will enable others skilled in the art to which it appertains to make and use the same.

This invention relates to the treatment of food products, as described in my application, Ser. No. 553,039, filed April 2, 1910, of which the present application is a division.

The invention has special reference to the treatment of pineapples, in which application the process has been found to be of great commercial importance. Pineapples are canned in large quantities, and the improved process lends itself readily and with marked advantage to the treatment of pineapples that are to be placed on the market in this form. By the present process a pineapple of a light color and not fully ripe may be turned to a yellow or golden color and sweetened in a remarkably short time, after which it will have the appearance and properties of a fully matured luscious pineapple. In this case, already peeled fruit, which does not need to undergo any preliminary treatment, is treated with a suitable syrup which may, for example, consist of refined cane sugar and water, with which the pores or cells of the fruit are filled in the manner to be hereinafter described.

Figure 1:
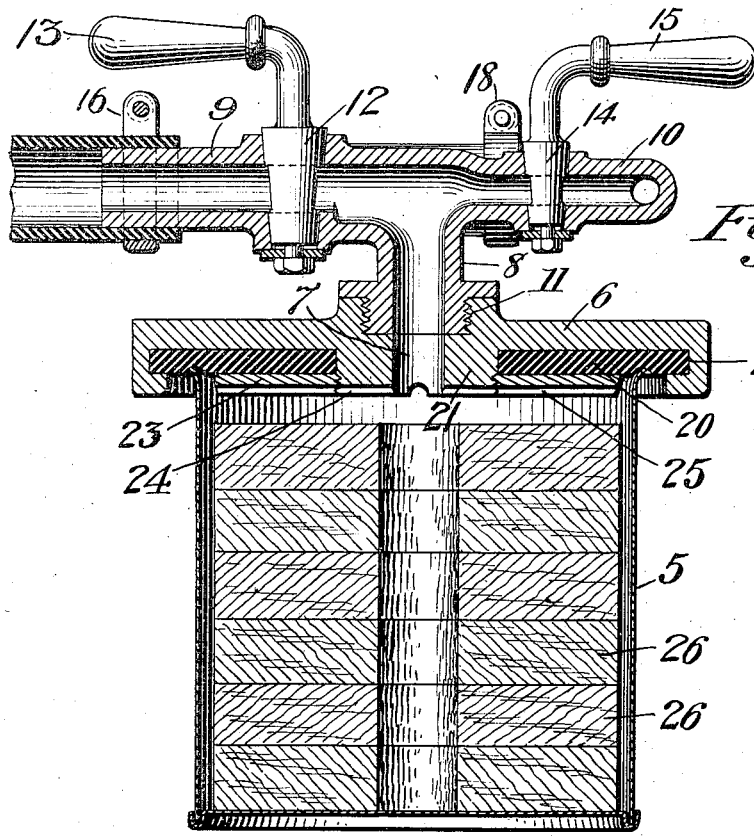
Figure 2:
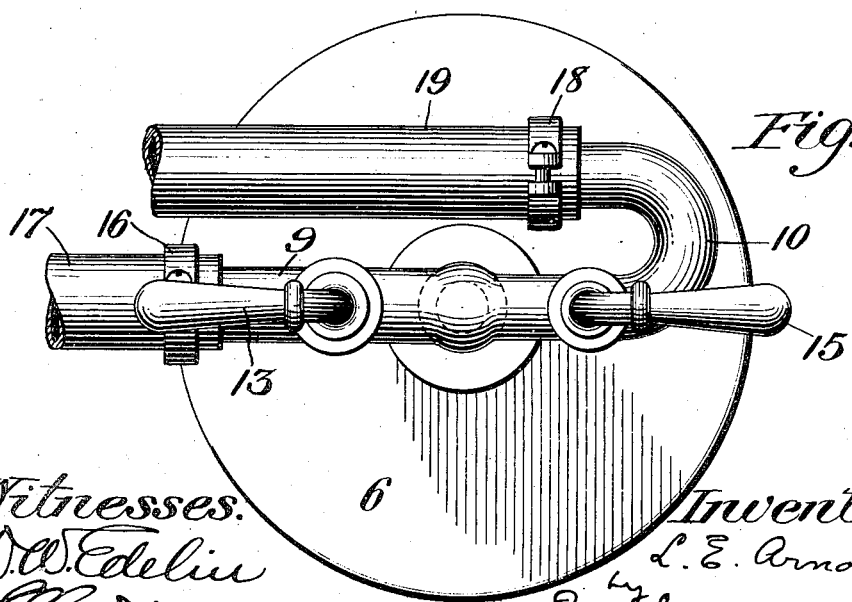

In the accompanying drawing, Figure 1 is a vertical central section of a simple arrangement for carrying out the improved process, and Fig. 2 is a top plan view of the parts shown in Fig. 1.

In the drawing 5 is a container open at the top and illustrated as consisting of an ordinary sheet metal can body, although containers of various kinds may be used. Temporarily applied to the top of the container 5 is a cap 6 which is of greater cross sectional area than the container, which it overhangs at the peripheral portion of the cap, as shown in Fig. 1. The cap 6 is provided, preferably at its center, with an opening or aperture 7 by means of which, when the container is sealed by the cap, communication can be had with the interior of the container. A pipe 8 having oppositely directed lateral branches 9, 10 is screwed into the top of the cap, as indicated at 11, in position to communicate with the opening 7. The branch 9 of this pipe is provided with a suitable controlling cock 12 adapted to be operated by a handle 13, while the branch 10 is provided with a similar cock 14 having a handle 15. The branch 9 is connected by a clip 16 with a tube 17, which may be flexible, and the branch 10 is connected by a similar clip 18 with a similar tube 19. These two tubes are intended to communicate with sources of vacuum and fluid respectively, and in the embodiment shown, the tube 17 is intended to convey a suitable fluid medium, such as syrup, to the container, while the tube 19 is intended to be connected with a suitable air exhausting device.

The cap 6 rests on the container top by means of a suitable gasket 20, preferably of rubber, which lies against the under surface of the cap and around the opening 7, which latter is preferably formed in a suitably thickened or hub-like portion 21. At its peripheral portion, the gasket may be held in place in a suitable groove 22 of the cap, and said gasket may be tightly clamped between the under surface of the cap and a nut 23 which is of thin flat shape and screws on the enlarged portion 21, as shown. The nut 23 preferably extends over a comparatively large area, its periphery being arranged in close proximity to the upper edge of the container. When the cap is placed on the container in the manner shown, the nut 23 extends down into the container to a slight extent, but sufficiently to prevent the container from collapsing when the same is exhausted of air. With this construction, the gasket 20 is effectively held in place and an air tight joint may be easily formed between the upper edge of the container and said gasket. In order to facilitate access to all parts of the container the lower surfaces of the hub-like portion 21 and of the nut 23 are preferably provided with alined radial grooves 24, 25.

In carrying out the process, the pineapple is placed in the container 5, which is then temporarily sealed by the cap 6, which should be held down on the container to such an extent as to form an air-tight joint, as above explained. In the drawing, I have shown the container as filled with the usual washer-shaped pineapple slices 26, and it will be assumed that these slices are to be improved as regards their color and flavor in the manner previously indicated, in which case the tube 17 is connected with a receptacle filled with a suitable sugar solution. The cock 12 being closed, the cock 14 will be opened when the container is tightly sealed, and hence the container will be placed in communication with the exhausting device so that it will be exhausted of air. The container is subjected to the action of the vacuum, which should be equivalent to about 28 inches of mercury, for about 45 seconds, and in this time the container will not only be exhausted of air and any other gases that may be in the same, but the air or gas in the pores, cells or interstices of the fruit is removed from the latter and from the container. If a glass container is used, bubbles may be observed coming out of the cells and interstices of the fruit during this stage of the operation. After the vacuum connection is closed, by suitably manipulating the cock 14, syrup is admitted to the evacuated container by opening the cock 12, which will permit the syrup to flow into the container by way of the opening 7 in an obvious manner. Owing to the evacuated condition of the container and of the fruit therein, the container will be filled immediately with the syrup, which will pass into the cells or pores of the fruit and thoroughly impregnate the latter. The fruit will then immediately undergo the desired change in color (turning a golden yellow) and its flavor will be remarkably improved. After the syrup supply is cut off by suitable manipulation of the cock 12, the cap may be removed from the container, which is then ready for permanent capping or any other operation desired. It has not been established whether or not the immediate change in the fruit thus treated (particularly in color) is due to a chemical change in the fruit itself. The change in color is almost instantaneous after the syrup is admitted, but it can hardly be due to the sugar solution, which in itself is colorless. Of course this solution must enter the cells of the fruit and remain permanently therein, in order to give the fruit the desired sweetness and flavor. It makes no change, however, in the color of fruit which is yellow before treatment.

It is obvious that numerous changes in the apparatus and in the minor details of the process itself may be adopted without departing from the scope of the invention as defined in the claim.

What I claim is:—

A process for coloring light colored pineapple which comprises sealing the peeled pineapple in a suitable container, evacuating the container to withdraw the air or gases from all the pores or cells of the fruit and admitting to the evacuated container a syrup of refined cane sugar and water which enters all the pores or cells of the pineapple and so affects its properties as to immediately change the color of the pineapple.

In testimony whereof I affix my signature, in presence of two witnesses.

LEWIS E. ARNOLD.

Witnesses:
ROBT. J. PRATT,
H. G. GINACA.